United States Patent Office 3,033,641
Patented May 8, 1962

3,033,641
PROCESS FOR CATION SEPARATION USING ZEOLITIC MATERIALS
Tudor L. Thomas, Jr., Snyder, N.Y., assignor to Union Carbide Corporation, a corporation of New York
No Drawing. Filed Mar. 21, 1956, Ser. No. 572,801
9 Claims. (Cl. 23—1)

This invention relates to a process for separating certain cations from mixtures thereof, and to a correlative process for cation enrichment in solution; these processes both being possible by the use of novel crystalline alumino-silicate materials.

Existing materials for cation separation by ion exchange are limited in the scope and efficiency of their application. This is true because the materials most usually employed for this purpose, such as alumino-silicate gels, nuclear sulfonic acids and carboxylic acid resins, have low cation exchange capacities and selectivities.

Certain synthetic zeolites have for some time been known to possess unique and useful molecular adsorptive properties. These zeolites, known as molecular sieves, exhibit marked preferences for some classes of molecules. The synthetic molecular sieves with which this invention is concerned are described in patent applications Serial Nos. 400,387, 400,388 and 400,389, filed December 24, 1953, the latter two having issued on April 14, 1959, as U.S. Patent Nos. 2,882,243 and 2,882,244, respectively.

These new crystalline synthetic alumino-silicates possess metal cations so distributed throughout their structure so as to balance the negative aluminum-oxygen tetrahedra. Their metal cations are exchangeable with other cations such that these crystalline synthetics can serve as ion-exchangers. In this connection, it now has been found that the order of ion-selectivity of these materials is different from, and more sharply defined than, that of conventional ion-exchange compositions. It also has been found that the total ionic capacity of crystalline, synthetic alumino-silicates is greater than that of prior art ion-exchange compositions.

It is, therefore, the principal object of this invention to profit from this realization in the utilization of these crystalline synthetic alumino-silicates for selective ion exchange separation of metal cations.

A further object of the invention is the provision of a process for separating certain given metal cations from mixtures containing a plurality of other metal cations.

A co-relative object of this invention is the provision of a process for enriching mixtures with certain metal cations. Another object is to separate ions by using certain synthetic alumino-silicates supported in a resin or plastic matrix or membrane.

The process by means of which the foregoing objects are attained comprises contacting the cation-containing solution mixture with the selected material, and collecting the thus treated mixture. Where desired, these operational steps may be repeated until satisfactory separation has been obtained, so that the process of the invention can produce a fractionating effect for the separation of cations. This effect can be achieved also by the use of a series of ion-exchange membranes. Similarly, a given mixture can be treated repeatedly until the desired cation enrichment has been obtained.

Among the ways of identifying particular synthetic alumino-silicate zeolites, and of distinguishing them from other crystalline substances is the employment of X-ray powder diffraction patterns. Accordingly, these will be used to aid in defining the adsorbents of the present invention.

The basic formula for the crystalline synthetic alumino-silicates suitable in the present process, where "M" is selected from the group consisting of lithium, hydrogen, magnesium, sodium, ammonium, cesium, nickel, copper, potassium, thorium, calcium, strontium, aluminum, barium, cobalt, gold, cadmium, mercury, zinc, and silver, and "n" its valence may be represented as follows:

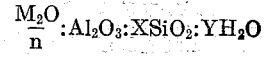

$$\frac{M_2O}{n}:Al_2O_3:XSiO_2:YH_2O$$

Y may be any value up to about 7. X can vary from 1.5 to about 4. The value X for a particular zeolite varies somewhat, since the aluminum atoms and silicon atoms occupy essentially equivalent compositions in the lattice.

As stated, the atom "M" can be one of several enumerated elements. For the sake of simplicity, and conciseness, however, the process of the herein-disclosed invention will be described in terms of the sodium form of the zeolites used.

For the purposes of this invention, zeolite A can be defined as a synthetic crystalline alumino-silicate having an X-ray powder diffraction pattern characterized by at least those reflections set forth in Table I. A typical composition for the sodium form of zeolite A may be represented as

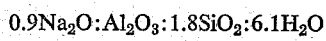

$$0.9Na_2O:Al_2O_3:1.8SiO_2:6.1H_2O$$

Sodium zeolite A is described in detail in co-pending application Serial No. 400,388, filed December 24, 1953, now U.S. Patent No. 2,882,243, having issued April 14, 1959.

Table I d VALUE OF REFLECTION IN A.

12.2±0.2
8.6±0.2
7.05±0.15
4.07±0.08
3.68±0.07
3.38±0.06
3.26±0.05
2.96±0.05
2.73±0.05
2.60±0.05

Zeolite B may be defined as a synthetic crystalline alumino-silicate having an X-ray powder diffraction pattern characterized by at least those reflections set forth in Table II below.

Table II

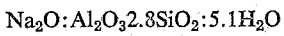

d VALUE OF REFLECTION IN A.

7.10±0.1
4.97±0.1
4.10±0.1
3.18±0.1
2.68±0.08

The composition for sodium zeolite B may be represented typically as $Na_2O:Al_2O_3 2.8SiO_2:5.1H_2O$ Sodium zeolite B is described in detail in co-pending application Serial No. 400,387, filed December 24, 1953.

Zeolite X possesses the X-ray powder diffraction pattern characterized by at least those reflections set forth in Table III below.

Table III d VALUE OF REFLECTION IN A.

14.42±0.2
8.82±0.1
4.41±0.05
3.80±0.05
3.33±0.05
2.88±0.05
2.79±0.05
2.66±0.05

A typical composition for the sodium form of zeolite X may be represented as $0.9Na_2O:Al_2O_3:2.5SiO_2:6.1H_2O$ As regards further properties and methods of preparation, sodium zeolite X is described in detail in co-pending application Serial No. 400,389, filed December 24, 1953.

The operation of these synthetic crystalline zeolites as ion-exchangers can be explained as follows.

Inasmuch as the zeolites consist of alumino-silicate structures containing exchangeable cations, cations in solution are able to pass into the alumino-silicate structure and reach the exchangeable cation. Ion exchange separations occur in the instant process when the exchangeable cation of the alumino-silicate zeolite is preferentially exchanged with some cations more than with other cations. The readily exchanged cations enter the zeolite while the lesser exchanged cation or cations remain in solution. Solution enrichment occurs where at least one of the cations present therein is removed therefrom by ion-exchange, as a result of which the solution then becomes relatively richer in cations remaining therein. By means of the process of the invention it is possible also to enrich solutions with a cation normally present as the exchangeable cation of a given zeolite.

The process of the invention may be carried out as a column operation in which the cation mixture is poured down through a bed of zeolite; or it may be carried out in a static operation in which the zeolite is mixed with the cation mixture and allowed to stand until the reaction is complete. Similarly, ion-exchange membranes containing zeolites may be used. When the zeolite is used as an ion exchanger in column or static operations, the solution to be ion-exchanged is passed through the zeolite bed. The effluent from this bed always contains the exchanged cations from zeolites as impurities. When the zeolite bed has been completely exchanged, it must be regenerated to renew the exchangeable cations of the zeolite. A convenient method of accomplishing this consists in passing through the bed, a solution containing the desired cation.

It is apparent then that the process of the invention is amenable to empirical employment, that is to say that particular cations present in a solution may be removed by contacting the solution with a given zeolite, the effluent material being conventionally analyzed and re-treated until tests indicate the absence of the cation whose removal was desired.

In the course of developing the present process, cation selectivity data were obtained by exchanging the sodium cation of zeolites A, B and X with various metal ions. In the procedure employed for this determination, the exchanging solutions each contained a single metal salt, and a sodium salt having a common anion therewith, in such concentration that the total solution normality was unity. The procedure employed was to agitate the solution for 48 hours with a portion of 1/16 inch diameter synthetic zeolite pellets. Analysis of the initial and final solutions indicated the equilibrium conditions before and after ion exchange. A separation factor, denominated α, was selected to express this qualitative measurement, and can be defined, for the present purpose, as 100 times the difference between the metal cation equivalent fraction in the zeolite, and the metal cation equivalent fraction in solution after ion exchange. Qualitatively, the magnitude of a positive alpha value indicates the selectivity of the zeolite for the given metal ion in preference to the zeolite cation, in the present case, sodium ion. Conversely, the magnitude of a negative alpha value expresses the zeolite's preference for the sodium ion.

Conducive to a better understanding of the foregoing determination of ion selectivity, Example I below illustrates the calculation of separation factors for sodium zeolite A and the silver ion at various solution concentrations.

EXAMPLE I

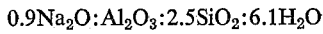

For this determination a 30 ml. portion of 1.0 N silver nitrate solution was mixed with 270 ml. of 1.0 N sodium nitrate solution. The resulting 1.0 N solution was 0.1 N in silver cation and 0.9 N in sodium cation. 100 ml. of this solution were mixed with 10 grams of sodium zeolite A pellets having a diameter of 1/16 inch, and were agitated therewith for 48 hours. After this period of mixing, the pellets were separated from the solution by filtration. Both the initial and the final solutions were analyzed for silver and sodium cation content. These analyses indicated that 18.3 milliequivalents of silver cations were ion-exchanged with sodium cations in the zeolite. As the zeolite sample originally had contained 47.2 milliequivalents of sodium cation, there were then, by virtue of the difference (47.2—18.3), 28.9 milliequivalents of sodium cations in the zeolite. The equivalent fraction of silver cations in the zeolite, therefore, was 0.388. After treatment, the silver cation equivalent fraction in solution was 0.001. By virtue of the definition given above, the separation factor was computed by the operation $$(100)(0.388-0.001)=38.7.$$

The above procedure was repeated using various amounts of 1.0 N silver nitrate and 1.0 N sodium nitrate solutions to obtain solutions having an initial silver cation normality of 0.4, 0.7 and 1.0, respectively. The equivalent fractions of silver cations in both zeolite and in the solution after ion exchange were calculated for these above reactions, and plotted as zeolite fraction against solution fraction. Equilibrium values for the silver cation of zeolite at solution equivalent fractions of 0.02, 0.1, 0.3, 0.5 and 0.7 were read from the graph, and separation factors calculated therefrom. These values are listed in Table IV under the silver cation heading.

The selectivity for the various cations, each relative to sodium, was determined in a similar manner by plotting the cation equivalent fraction in the zeolite against that in the solution at equilibrium. Generally speaking, such a plot presents a curve similar to the vapor pressure X—Y diagram. Thus all points lying above the 45° line indicate a selectivity for the metal cation in preference to the sodium ion, while the converse is true for points lying below the 45° line.

Separation factors for the tested cations are listed in Tables IV, V, and VI.

Table VI

METAL ION-SODIUM ION SEPARATION FACTOR FOR B ZEOLITES EXCHANGING 1/16" Na₂ B PELLETS IN SOLUTIONS OF 1.0 TOTAL NORMALITY

| Order of Preference | Exchanging Ion | Separation Factor at Initial Solution Concentration of 0.5 N Na+ and 0.5 N Metal Cation |
|---|---|---|
| 1 | Ag+ | 75 |
| 2 | Cd++ | 28 |
| 3 | Ca++ | 23 |
| 4 | Zn++ | 22 |
| 5 | K+ | 0 |
| 6 | Mg++ | −29 |

The separation factors listed in Table VI were not determined from a plot of cation equivalent fraction in zeolite vs. cation equivalent fraction in solution, as were the separation factors listed in Tables IV and V. In this case a solution of 0.5 N Na+ and 0.5 N metal cation containing a common anion was exchanged with sodium zeolite B for each different cation listed.

The above tables indicate that numerous cation separations or enrichments are possible using synthetic crystalline zeolites.

The following remarks follow from an examination of the data presented in Tables IV, V, and VI. As a starting point, it can be said that for a given solution concentration, separations may be predicted on the basis of separation factor. The greater the numerical difference in factors for a given cation mixture, the greater the mixture separation or enrichment.

Examination of the above tables also indicates that the separation factor depends to an extent on the concentration of the solution cations. Accordingly, no over-all predictions of separations can be made unless solution concentration is known. Again certain specific relationships are of interest. For example, alkaline earth metals possess the following decreasing selectivity.

Ba>Sr>Ca>Mg on zeolite X

Similarly uni-valent cations show the following decreasing selectivity

H>NH₄>K>Na>Li on zeolite X

In the case of conventional ion-exchange materials, the higher the positive charge, the stronger is the exchange, that is to say that the following relationship holds true:

$M^{+4} > M^{+3} > M^{+2} > M^{+1}$

This rule of thumb is not followed by zeolites, where on the contrary the following relationship holds:

Ag+>Cu++>Th++++>Al+++ on zeolite A
Ag+>Cu++>Ba++>Al+++>Th++++ on zeolite X

Examination of the same tables readily discloses separations having commercial applications. Thus, for example, mixtures of cobalt-nickel, and zinc cadmium can be separated with sodium zeolite A. Rare metals also may be separated and recovered. Calcium-magnesium and silver-gold separations can be obtained using sodium zeolite A or X. Sodium zeolite B can separate calcium-magnesium mixtures. In the above separations, the first number of each combination is the preferentially exchanged cation, and is thus the one removed from the solution in larger quantities than the other.

The following example illustrates the application of the process of the invention. In this experiment sodium zeolite A was used to separate cobalt from nickel. A 474 ml. solution (0.2886 normality) containing 4.3 grams of CoCL₂ (66.3 milliequivalents) and 6.3 grams Ni(NO₃)₂ (69.3 milliequivalents) was passed through a bed of sodium zeolite A (clay bonded, 1/16 inch pellets crushed to 14 x 30 mesh size) contained in a glass column 92 centimeters long and 1.6 centimeters in diameter. The effluent solution was collected and analyzed. The results indicated that 2.4 grams of Ni(NO₃)₂ (26.0 milliequivalents) and 0.11 gram of CoCl₂ (1.7 milliequivalents) were recovered in the effluent. The amount indicated represented 38 mol percent of the nickel placed in contact with the zeolite bed. On elution of the zeolite bed with 5 N NaCl, 2.2 grams of CoCl₂ or 33.5 milliequivalents were recovered. This amount equalled 51 mol percent of the total cobalt placed in contact with the zeolite bed.

The synthetic crystalline ion-exchange materials heretofore described may be fabricated into plastic membranes capable of transferring ions under an applied electric field. Ions preferentially held on the zeolite are transferred across the membrane in the greater quantity. These supporting membranes may be composed of any conventional material such as polyethylene or phenol-formaldehyde resins.

The solution to be separated is placed on one side of the membrane and a water solution is placed on the other side of the membrane. An electric potential is then applied across the membrane with the negative pole opposite from the cation solution. The cations are then attracted by the cathode and try to pass through the membrane. A cation enrichment of the more preferentially exchanged cation will then occur on the cathode side of the membrane. This enriched solution may then be passed through another membrane to obtain greater enrichment of the preferentially exchanged cation. If a sufficient number of these transfer "cells" are connected in series, complete separation can be accomplished.

The above-mentioned membranes have the distinct advantage of not requiring regeneration as do ion-exchangers used in column or static operation. In addition, the exchanged solutions are not contaminated by cations obtained from the exchange of the zeolite.

The following table lists these separations which for the most part verify the predictions based on Tables IV and V. The only exception is the NH₄—Ag separation. In this case the possible complexing of the silver ions enabled the ammonium ions to be transferred preferentially.

Table VII

RELATIVE ION TRANSFER THROUGH MOLECULAR SIEVE MEMBRANES

| Cation Mixture | Zeolite Membrane | Cation Transferred Preferentially |
|---|---|---|
| Na—K | A, X | K |
| Na—Li | A, X | Na |
| K—Li | A, X | K |
| Na—Ca | A, X | Ca |
| Na—Mg | A, X | Na |
| Ca—NH₄ | A, X | Ca |
| NH₄—Ag | X | NH₄ |

The following example illustrates one application of synthetic crystalline zeolite membranes to separate a cation mixture:

A membrane (1⅛ in. diameter and 3 mm. thick) composed of 50 wt.-percent sodium zeolite A and 50 wt.-percent methyl methacrylate was sealed across the bottom of a ¾ in. I.D. tube composed of a polymethylmethacrylate resin and held in place by means of a rubber O-ring and a plastic nut screwed on to the base of the above tube. This tube and membrane apparatus was then placed into a 300 cc. beaker. A solution (150 cc.) of LiCl (0.2 Molar) and KCl (0.2 Molar) was placed in the beaker outside of the tube and 25 cc. of NaCl solution (0.025 Molar) was placed inside of the tube. An anode was then placed in the beaker solution and a cathode was placed in the salt solution inside the tube. A 5.9 v. D.C. potention was placed across the electrodes to produce an initial current of 9.2 ma. After 16 hours of operation, the current had decreased to 8.2 ma. and the voltage had dropped to 4.6 v. This run was made to "condition" the membrane to the KCl—LiCl mixture by exchanging the sodium ions of the membrane with potassium and lithium ions.

The above "conditioned" membrane was then re-used. The plastic tube and membrane were again placed in a beaker and surrounded with 150 cc. solution of LiCl (0.2 Molar) and KCl (0.2 Molar). The tube was filled with 25 cc. of NaCl solution (0.025 Molar). Electrodes were placed in the solution and a 10 v. D.C. potential applied. Operation was continued for eight hours during which time the voltage varied from 10–5.2 v. and the current varied from 40–62 ma. The initial and final solutions, both inside and outside the tube were analyzed for potassium and lithium content. The analysis results are as follows:

|  | Millimoles | |
| --- | --- | --- |
|  | K | Li |
| Change in cation content of outside solution | −4.6 | −0.8 |
| Change in cation content of inside solution | +4.0 | +1.2 |

The above definitely indicates that potassium ions are transferred preferentially to lithium ions and a separation can be effected.

Obviously where several cations are present in a mixture, the process of the invention can be modified by the employment of several zeolites at different steps along the separation. Thus, assume a mixture of cations arbitrarily designated as A, B, and C, the concentration of their solution being y N. A zeolite having a preferential affinity for cation A may be used to treat this solution to remove A therefrom. Then another zeolite having a preferential adsorption for B may be used to treat the solution. At the end of this process only C remains in solution.

Again using tables like the ones herein presented, which indicate that exchange selectivity of a given zeolite changes with solution concentration, we may take the previous example and proceed as follows.

As indicated, cations A, B and C are present in a solution of y N concentration. A zeolite having a preferential adsorption for cation A at y N concentration may be used to separate A from the mixture. This separation terminated, the solution concentration may then be changed by conventional methods to another concentration such as x N, this concentration being the one at which the same zeolite preferentially adsorbs cation B. This extraction complete, only cation C remains in solution.

As regards cation enrichment of solutions, the same may be accomplished, in one case, as follows.

Assume a solution containing cations A, B and C, in which cation B is present at a concentration of z N. Assume further that it is desired to make this same solution 2z N with respect to cation B. For his purpose a zeolitic material whose exchangeable cation is B may be preselected to extract A or C from solution, and replace it with the desired amount of B.

An important reason for the superiority of the present process over conventional ion exchange processes is due to the greater ion exchange capacities of zeolites over that possessed by commercial cation exchangers of the prior art. Table VIII lists the exchange capacities of such prior art materials, and those of zeolites A, B and X in the pellet form. The capacities referred to in the first column refer to the actual number of cations in milli-equivalents available for exchange per gram of dehydrated material. At this point it is well to note that the resins in their hydrated condition swell from 50 percent to 100 percent over their dry state volume, while the zeolites only have negligible expansion. Accordingly the second column of capacities in milli-equivalents per cubic centimeter of the hydrated materials gives a truer basis of comparison, since the exchangers are actually used in this condition in ion exchange columns.

Table VIII

COMPARISON OF ION EXCHANGE CAPACITIES

| Ion Exchanger | Capacity (Total Cation Available) | |
| --- | --- | --- |
|  | Measured,[1] meg./gram | Estimated,[2] meg./cc. |
| A zeolite pellets | 7.0 | 5.9 |
| X zeolite pellets | 6.0 | 5.1 |
| B zeolite pellets | 6.0 | 5.1 |
| Sodium-alumino-silicate gel | 3.7 |  |
| Carboxylic acid resin | [3] 10.4 | [3] 4.8 |
| Nuclear sulfonic acid resin | 4.7 | 1.8 |

[1] Actual measured capacities based on the dehydrated weight.
[2] Based on an estimated degree of swelling for the fully hydrated resins.
[3] Ultimate capacity in high pH solutions. This capacity reduces to nearly zero as the pH is lowered to about 3.

To demonstrate the superiority of the process of the invention over prior art processes employing exchange resins, the ion exchange selectivities of the sodium forms of zeolites A, B and X, and of commercially available exchange resins were determined using the method outlined in Example I above. Table IX below shows the zeolites to be considerably more selective among these six representative cations than are the exchange resins. Zeolites show not only a greater range of separation factors (77 to −12 for sodium A, as against 40 to −8 for the most selective resin), but also show a convenient spread between the separation factors within this range. Obviously the process of the invention does not depend strictly nor primarily on the difference in ionic radii of the separated cations. Were this process strictly dependent upon the previously known capacity of zeolites for the sorting out of material on the basis of substantial differences in size, it could not perform the separations indicated, as for example zinc, which may be easily separated from cadmium, differs in ionic radius therefrom by only 0.23 Angstrom. Similarly calcium may be separated from magnesium, which differs from it in ionic radius by only 0.31 Angstrom.

Table IX

COMPARISON OF ION EXCHANGE SELECTIVITIES

| Ion Exchanger [1] | Separation Factor [2] | | | | | |
| --- | --- | --- | --- | --- | --- | --- |
|  | $Ag^+$ | $Zn^{++}$ | $K^+$ | $Ca^{++}$ | $Cd^{++}$ | $Mg^{++}$ |
| Sodium A | 77 | 33 | 12 | 11 | −5 | −12 |
| Sodium B | 75 | 22 | 0 | 23 | 28 | −29 |
| Sodium alumino-silicate gel | 60 | −15 | 28 | −23 | −4 | −28 |
| Carboxylic acid resin | 48 | 48 | 18 | 32 | 48 | 14 |
| Nuclear sulfonic acid resin | 40 | 19 | 0 | 33 | 25 | −8 |

[1] All exchangers were initially in their Na form.
[2] In solutions containing 0.1 equivalent fraction of the exchanging ion.

Various changes may be made as desired in the order of operational steps, which may be transposed or reversed, and various zeolitic materials may be used equivalently without departing from the range of the invention or the scope of the claims.

Table IV

METAL ION-SODIUM ION SEPARATION FACTOR FOR A ZEOLITES EXCHANGING 1/16" Na₂ A PELLETS IN SOLUTIONS OF 1.0 TOTAL NORMALITY

| Order of Preference | Exchanging Ion | αSeparation Factor At Equilibrium Solution Concentrations of— | | | | |
|---|---|---|---|---|---|---|
| | | 0.02 | 0.10 | 0.30 | 0.50 | 0.70 |
| 1 | Ag⁺ | 78 | 79 | 67 | 48 | 29 |
| 2 | Cu⁺⁺ | 59 | 61 | 52 | 38 | |
| 3 | Th⁺⁺⁺⁺ | | 31 | 34 | 31 | 16 |
| 4 | Al⁺⁺⁺ | 29 | 30 | 31 | 20 | 5 |
| 5 | H⁺ | 7 | 31 | 31 | 16 | 1 |
| 6 | Zn⁺⁺ | 26 | 37 | 26 | 12 | −4 |
| 7 | Sr⁺⁺ | 27 | 38 | 36 | 9 | −8 |
| 8 | Ba⁺⁺ | 16 | 26 | 18 | | |
| 9 | Ca⁺⁺ | 14 | 15 | 12 | 3 | −10 |
| 10 | Co⁺⁺ | 15 | 20 | 18 | 2 | −15 |
| 11 | Au⁺⁺⁺ | 6 | 25 | | | |
| 12 | K⁺ | 4 | 15 | 11 | −3 | −7 |
| 13 | Na± | 0 | 0 | 0 | 0 | 0 |
| 14 | Ni⁺⁺ | 10 | 7 | −4 | −15 | −27 |
| 15 | NH₄⁺ | 4 | 3 | −6 | −18 | −27 |
| 16 | Cd⁺⁺ | 11 | 4 | −11 | −20 | −24 |
| 17 | Hg⁺⁺ | | −4 | −20 | −38 | |
| 18 | Li⁺ | 0 | −5 | −24 | −36 | −28 |
| 19 | Mg⁺⁺ | | −5 | −20 | −35 | −51 |

Table V

METAL ION-SODIUM ION SEPARATION FACTORS FOR X ZEOLITES EXCHANGING 1/16" Na₂ X PELLETS IN SOLUTIONS OF 1.0 TOTAL NORMALITY

| Order of Preference | Exchanging Ion | αSeparation Factor At Equilibrium Solution Concentrations of— | | | | |
|---|---|---|---|---|---|---|
| | | 0.02 | 0.10 | 0.30 | 0.50 | 0.70 |
| 1 | Ag⁺ | 55 | 73 | 65 | 50 | 30 |
| 2 | Cu⁺⁺ | 35 | 54 | 50 | 39 | |
| 3 | H⁺ | 31 | 54 | 49 | 34 | 26 |
| 4 | Ba⁺⁺ | 36 | 58 | 44 | 25 | |
| 5 | Al⁺⁺⁺ | 37 | 48 | 38 | 23 | 7 |
| 6 | Th⁺⁺⁺⁺ | | 35 | 20 | 7 | 0 |
| 7 | Sr⁺⁺ | 20 | 26 | 21 | 6 | −10 |
| 8 | Hg⁺⁺ | 2 | 9 | 22 | 27 | 21 |
| 9 | Cd⁺⁺ | 28 | 22 | 9 | −1 | −7 |
| 10 | Zn⁺⁺ | 14 | 13 | 7 | 1 | −6 |
| 11 | Ni⁺⁺ | 18 | 23 | 25 | 0 | −17 |
| 12 | Ca⁺⁺ | 15 | 18 | 14 | 0 | −18 |
| 13 | Co⁺⁺ | 19 | 23 | 12 | −3 | −18 |
| 14 | NH₄⁺ | 18 | 16 | 4 | −11 | |
| 15 | K⁺ | 2 | 9 | 7 | −11 | −17 |
| 16 | Au⁺⁺⁺ | 2 | 4 | 5 | | |
| 17 | Na⁺ | 0 | 0 | 0 | 0 | 0 |
| 18 | Mg⁺⁺ | 0 | 0 | −10 | −24 | −40 |
| 19 | Li⁺ | −1 | −6 | −19 | −28 | −22 |

What is claimed is:

1. A process for separating cations from a solution mixture containing at least two cations selected from the group consisting of silver, copper, thorium, aluminum, hydrogen, zinc, strontium, barium, calcium, cobalt, gold, potassium, sodium, nickel, ammonium, cadmium, mercury, lithium and magnesium, which process comprises contacting said mixture with a synthetic crystalline molecular sieve zeolite having an ion-exchange preference for at least one of said cations in said solution mixture, and collecting the resulting effluent solution.

2. A process for separating cations from a solution mixture containing at least two cations selected from the group consisting of silver, copper, thorium, aluminum, hydrogen, zinc, strontium, barium, calcium, cobalt, gold, potassium, sodium, nickel, ammonium, cadmium, mercury, lithium and magnesium, which process comprises successively contacting said solution mixture with synthetic crystalline molecular sieve zeolite, said zeolite having an ion-exchange preference for at least one of the cations of said mixture at the given concentration of said cations in said mixtures; and collecting the resulting effluent solution.

3. The process of claim 2, wherein the treated mixture is repeatedly contacted with the zeolite until analysis indicates absence of the cation whose removal was desired.

4. A process for separating cobalt ions from a solution mixture of cobalt and nickel cations, which process comprises contacting such cation-containing solution with sodium zeolite A, and collecting the effluent solution, whereby said cobalt is preferentially ion-exchanged by sodium zeolite A, the nickel remaining in said effluent solution.

5. A process for separating zinc ions from a solution mixture of zinc and cadmium cations, comprising contacting such cation-containing mixture with sodium zeolite A, and collecting the effluent solution, whereby said zinc is preferentially ion-exchanged by said sodium zeolite A, and said cadmium remains in said effluent solution.

6. A process for separating calcium ions from a solution containing calcium and magnesium cations, which process consists in contacting said solution with at least one zeolite selected from the group consisting of sodium zeolite A and sodium zeolite X, and collecting the effluent solution, whereby said calcium is ion-exchanged preferentially by said zeolite, and said magnesium is left in said effluent solution.

7. A process for separating silver ions from a solution containing silver and gold cations, which process consists in contacting said solution with at least one zeolite selected from the group consisting of sodium zeolite A and sodium zeolite X, and collecting the effluent solution, whereby said silver ions are ion-exchanged preferentially by said zeolite, and said gold ions are left in said effluent solution.

8. A process for separating silver ions from a solution containing silver and sodium cations, which process comprises contacting such cation-containing solution with sodium zeolite A, and collecting the effluent solution whereby said silver is preferentially ion-exchanged by sodium zeolite A, the sodium remaining in said effluent solution.

9. A process for separating calcium ions from a solution containing calcium and ammonium ions, which process comprises contacting such cation-exchanging solution with sodium zeolite A, and collecting the effluent solution whereby said calcium is preferentially ion-exchanged by sodium zeolite A, the ammonium remaining in said effluent solution.

References Cited in the file of this patent

UNITED STATES PATENTS

| | | |
|---|---|---|
| 2,468,471 | Thurston | Apr. 26, 1949 |
| 2,636,851 | Juda et al. | Apr. 28, 1953 |
| 2,882,243 | Milton | Apr. 14, 1959 |
| 2,882,244 | Milton | Apr. 14, 1959 |

OTHER REFERENCES

Kurnakov et al.: "Permutite and Its Properties," Izvestiya Akodemii Nauk USSR, 1937, Otdeleniye Matematicheskikh i Yestestvennykh Nauk, Sections A and B.

Kunin et al.: "Ion Exchange Resins," New York; Wiley, 1950, pages 30 and 31.

Nachod: "Ion Exchange," New York; Academic Press, 1949, p. 175.

Turner: "Condensed Chemical Dictionary," New York; Reinhold, 1950, page 713.